United States Patent
Watanabe et al.

(10) Patent No.: US 7,365,792 B2
(45) Date of Patent: Apr. 29, 2008

(54) IMAGE SIGNAL PROCESSOR FOR PROCESSING IMAGE SIGNALS OF A PREDETERMINED FORMAT

(75) Inventors: Tohru Watanabe, Ogaki (JP); Takashi Tanimoto, Gifu-ken (JP); Tatsuya Takahashi, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 714 days.

(21) Appl. No.: 10/208,614

(22) Filed: Jul. 30, 2002

(65) Prior Publication Data

US 2003/0026616 A1   Feb. 6, 2003

(30) Foreign Application Priority Data

Aug. 1, 2001   (JP)  .............................. 2001-233805
Apr. 10, 2002  (JP)  .............................. 2002-107897

(51) Int. Cl.
    H04N 5/225    (2006.01)
    H04N 5/222    (2006.01)
(52) U.S. Cl. ...................... 348/372; 348/374; 358/475
(58) Field of Classification Search ............... 348/374, 348/372
    See application file for complete search history.

(56) References Cited

U.S. PATENT DOCUMENTS

| | | | |
|---|---|---|---|
| 5,493,409 A | 2/1996 | Maeda et al. | |
| 5,963,255 A * | 10/1999 | Anderson et al. | 348/372 |
| 6,078,210 A | 6/2000 | Uchida et al. | |
| 6,236,262 B1 | 5/2001 | Mellot | |
| 6,377,073 B1 * | 4/2002 | Krasnansky | 326/82 |
| 6,856,352 B1 * | 2/2005 | Kijima | 348/312 |
| 7,129,985 B1 | 10/2006 | Koizumi et al. | |
| 2003/0043287 A1 | 3/2003 | Kakiuchi et al. | |
| 2003/0200473 A1 | 10/2003 | Fung | |
| 2003/0218690 A1 * | 11/2003 | Sakaegi | 348/372 |
| 2004/0120690 A1 * | 6/2004 | Takeshita et al. | 386/46 |

FOREIGN PATENT DOCUMENTS

| | | |
|---|---|---|
| JP | 57-29916 | 2/1982 |
| JP | 57-085110 | 5/1982 |
| JP | 63-246081 | 10/1988 |
| JP | 02-082774 | 3/1990 |

(Continued)

OTHER PUBLICATIONS

"TLC876M Analog-To-Digital Converters" Texas Instruments SLAS140E- Jul. 1997—Revised Oct. 2000.*

(Continued)

*Primary Examiner*—Tuan Ho
*Assistant Examiner*—Hung H. Lam
(74) *Attorney, Agent, or Firm*—Fish & Richardson P.C.

(57) ABSTRACT

A signal processor for reducing power consumption. The signal processor includes a signal processing circuit and an output circuit, which outputs an image signal generated by the signal processing circuit. The signal processor further includes a first regulator for generating a first regulated voltage from a power supply voltage and supplying the first regulated voltage to the signal processing circuit. A second regulator generates a second regulated voltage, which is greater than the first regulated voltage, from the power supply voltage and supplies the second regulated voltage to the output circuit.

9 Claims, 6 Drawing Sheets

FOREIGN PATENT DOCUMENTS

| | | | |
|---|---|---|---|
| JP | 02-248170 | * | 3/1990 |
| JP | 02-248170 | | 10/1990 |
| JP | 10-150766 | | 6/1998 |
| JP | 10-174048 | | 6/1998 |
| JP | 10-337001 | | 12/1998 |
| JP | 11-296241 | | 10/1999 |
| JP | 11-331682 | | 11/1999 |
| JP | 2000-224495 | | 8/2000 |

OTHER PUBLICATIONS

Bryan Ackland and Alex Dickinson (Camera on a Chip; IEEE Feb. 8, 1996 -pp. 22-26).*

"TLC876M Analog-To-Digital Converters" Texas Instruments SLAS140E—Jul. 1997—Revised Oct. 2000.

* cited by examiner

IMAGE SIGNAL PROCESSOR FOR PROCESSING IMAGE SIGNALS OF A PREDETERMINED FORMAT

BACKGROUND OF THE INVENTION

The present invention relates to an image signal processor for performing a predetermined signal process on an image signal output from a solid-state imaging device to generate an image signal complying with a predetermined format.

An imaging apparatus using a solid-state imaging device (CCD image sensor), such as a digital still camera, often uses a battery as a power supply. The range of the output voltage of a battery is limited. Therefore, a regulator circuit or a booster circuit is employed to drive the CCD image sensor.

FIG. 1 is a schematic block diagram of a prior art imaging apparatus 50. The imaging apparatus 50 includes a horizontal driver 8, a signal processing circuit 9, a timing control circuit 13, and an output circuit 14. The imaging apparatus 50 further includes a regulator circuit 2, which is located at the input side. The regulator circuit 2, which is supplied with power supply voltage from a battery, generates a predetermined regulated voltage VK. Accordingly, the imaging apparatus 50 operates with the single operational voltage, which is generated by the regulator circuit 2.

The CCD image sensor 3 is, for example, a frame transfer type, and includes an imaging section 3a, a charge section 3b, a horizontal transfer section 3c, and an output section 3d. The imaging section 3a has a plurality of light receiving pixels for accumulating information charges generated in accordance with an imaging subject. The charge section 3b temporarily stores the information charges corresponding to a single screen image that is retrieved from the imaging section 3a. The horizontal transfer section 3c sequentially retrieves the information charges from the charge section 3b and sequentially transfers the information charges in the horizontal direction in units of single pixels. The output section 3d receives information charges from the horizontal transfer section 3c, converts the information charges in units of single pixels to voltage values corresponding to the information charges, and generates an image signal Y(t). The image signal Y(t) is provided to the signal processor 7.

The drive device 4 includes a booster circuit 5 and a vertical driver 6, which are formed on the same semiconductor substrate. The booster circuit 5 includes a positive voltage generating charge pump and a negative voltage generating charge pump. The positive voltage generating charge pump increases the regulated voltage VK (e.g., 2.9V) to a predetermined positive voltage VOH (e.g., 5V) and supplies the positive voltage VOH to the CCD image sensor 3. The negative voltage generating charge pump boosts the regulated voltage VK to a predetermined negative voltage VOL (e.g., −5V) and supplies the negative voltage VOL to the vertical driver 6.

The vertical driver 6 operates with the negative voltage VOL and generates a frame transfer clock signal of and a vertical transfer clock signal øv. The clock signals øf and øv are respectively provided to the imaging section 3a and the charge section 3b of the CCD image sensor 3. The frame transfer clock signal of and the vertical transfer clock øv are generated in accordance with a frame shift timing signal FT, a vertical synchronizing signal VT, and a horizontal synchronizing signal HT, which are provided from the timing control circuit 13 of the signal processor 7. The information charges that are accumulated in the imaging section 3a are frame-transferred to the charge section 3b at a timing that is in accordance with the frame shift timing signal FT. The information charges that are accumulated in the charge section 3b are line-transferred to the horizontal transfer section 3c at a timing that is in accordance with the vertical synchronizing signal VT and the horizontal synchronizing signal HT.

A horizontal driver 8 operates with the regulated voltage VK and generates a horizontal transfer clock signal øh. The horizontal transfer clock signal øh is provided to the horizontal transfer section 3c of the CCD image sensor 3. The horizontal transfer clock signal øh is generated in accordance with the vertical synchronizing signal VT and the horizontal synchronizing signal HT, which are provided from the timing control circuit 13. The information charges retrieved in the horizontal transfer section 3c are sequentially and horizontally transferred in single pixel units at a timing that is in accordance with the horizontal synchronizing signal HT and converted to an image signal Y(t) by the output section 3d.

The signal processing circuit 9 includes an analog processing circuit 10, an A/D converter 11, and a digital processing circuit 12. The analog processing circuit 10 receives an image signal Y(t) from the CCD image sensor 3 and performs various types of analog signal processing, such as sample and hold and gain adjustment. The A/D converter 11 receives an image signal, which has undergone an analog processing, converts the image signal (n) to a digital signal in single pixel units, and generates digital image data signal Y(n).

The digital processing circuit 12 performs a predetermined matrix processing on the digital image signal Y(n), generates luminance data and chrominance data, performs processes such as contour correction and gamma correction on the luminance data, and generates image data signal Y'(n).

The timing control circuit 13, which operates with the regulated voltage VK supplied from the regulator circuit 2, divides a reference clock signal CK, which has a fixed cycle, and determines the vertical and horizontal scanning timing of the CCD image sensor 3. In accordance with the determined timing, the timing control circuit 13 generates the vertical synchronizing signal VT and the horizontal synchronizing signal HT. Further, the timing control circuit 13 generates the frame shift signal FT at a cycle coinciding with the cycle of the vertical synchronizing signal.

The output circuit 14 operates with the regulated voltage VK, receives the image data signal Y'(n) from the digital processing circuit 12 of the signal processing circuit 9, and provides the image data signal Y'(n) to external device including a central processing unit (CPU) 16, a memory 17, or a display driver 18 via a system bus 15. The CPU 16 centrally controls the operations of the imaging apparatus 50, the memory 17, and the display driver 18 in response to commands from peripheral devices. The memory 17 is a removable Memory (e.g., memory card or flash memory) or a fixed memory, such as a hard disk, and stores image data signal Y'(n), which is provided from the imaging apparatus 50. The display driver 18 receives the image data signal Y'(n) from the imaging apparatus 50, drives the display panel 19, and displays a reproduced image.

In the signal processor 7 of the imaging apparatus 50, after the regulator circuit 2 regulates the power supply voltage VDD from the battery to the predetermined regulated voltage VK, every circuit of the signal processor 7 is commonly supplied with the regulated voltage VK. Thus, the signal processor 7 is supplied with the single power supply voltage, which is set to coincide with the operational voltage of the output circuit 14 by the regulator circuit 2. The operational voltage of the output circuit 14 is greater than the operational voltage of the signal processing circuit 9. Accordingly, even though the power supply voltage, which is less that the regulated voltage VK, operates the signal processing circuit 9, the signal processing circuit 9 is supplied with the regulated voltage VK, which is greater than the operational voltage. As a result, the signal processing circuit 9 consumes unnecessary power. This may increase the power consumption of the imaging apparatus 50.

SUMMARY OF THE INVENTION

It is an object of the present invention to provide an imaging signal processor that reduces power consumption.

To achieve the above object, the present invention provides an image signal processor for performing a predetermined signal process on a first image signal, which is generated by a solid-state imaging device, and generating a second image signal, which is provided to an external device and complies with a predetermined format. The image signal processor includes a first regulator supplied with a power supply voltage to generate a first regulated voltage, which is in accordance with au output level of the solid-state imaging device. A second regulator is supplied with the power supply voltage to generate a second regulated voltage, which is in accordance with an input level of the external device. A signal processing circuit is connected to the solid-state imaging device and the first regulator and operates with the first regulated voltage. The signal processing circuit performs a predetermined signal processing on the first image signal and generates the second image signal. An output circuit is connected to the second regulator and the signal processing circuit and operates with the power supply voltage. The output circuit receives the second image signal from the signal processing circuit and provides the second image signal to the external device.

A further perspective of the present invention is an image signal processor for performing a predetermined signal process on a first image signal, which is generated by a solid-state imaging device, and generating a second image signal, which is provided to an external device and complies with a predetermined format. The image signal processor includes a regulator supplied with a power supply voltage, which is in accordance with an output level of the solid-state imaging device, to generate a regulated voltage, which is in accordance with an input level of the external device. An analog processing circuit operates with the power supply voltage. The analog processing circuit receives the first image signal from the solid-state imaging device and performs a predetermined analog signal processing on the first image signal. A digital processing circuit is connected to the regulator and operates with the regulated voltage. The digital processing circuit performs a predetermined digital signal processing on a digital first image signal converted from the first image signal, which has undergone the analog signal processing, to generate the second image signal. An output circuit is connected to the regulator and the digital processing circuit and operates with the regulated voltage. The output circuit receives the second image signal from the digital processing circuit and provides the second image signal to the external device.

A further perspective of the present invention is a method for supplying power supply voltage to an image signal processor. The image signal processor includes a signal processing circuit for performing a predetermined signal processing on a first image signal, which is generated by a solid-state imaging device, to generate a second image signal, which complies with a predetermined format, and an output circuit for receiving the second image signal from the signal processing circuit and providing the second image signal to an external device. The method includes receiving the power supply voltage and generating a first regulated voltage that is in accordance with an output level of the solid-state imaging device, supplying the signal processing circuit with the first regulated voltage, receiving the power supply voltage and generating a second regulated voltage that is in accordance with an input level of the external device, and supplying the output circuit with the second regulated voltage.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
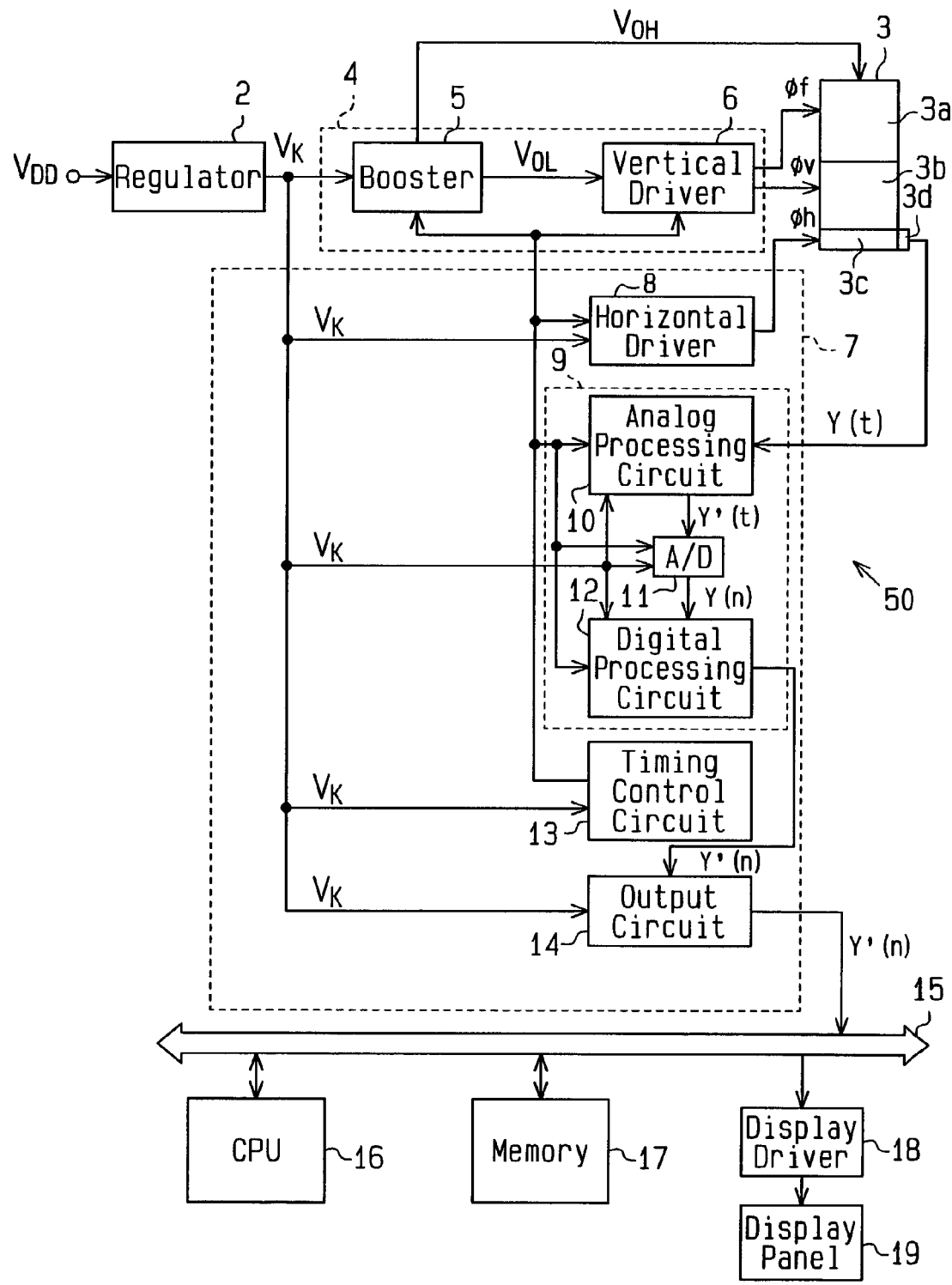
FIG. 1 is a schematic block diagram of a prior art imaging apparatus.

In the drawings, like numerals are used for like elements throughout.

Figure 2:
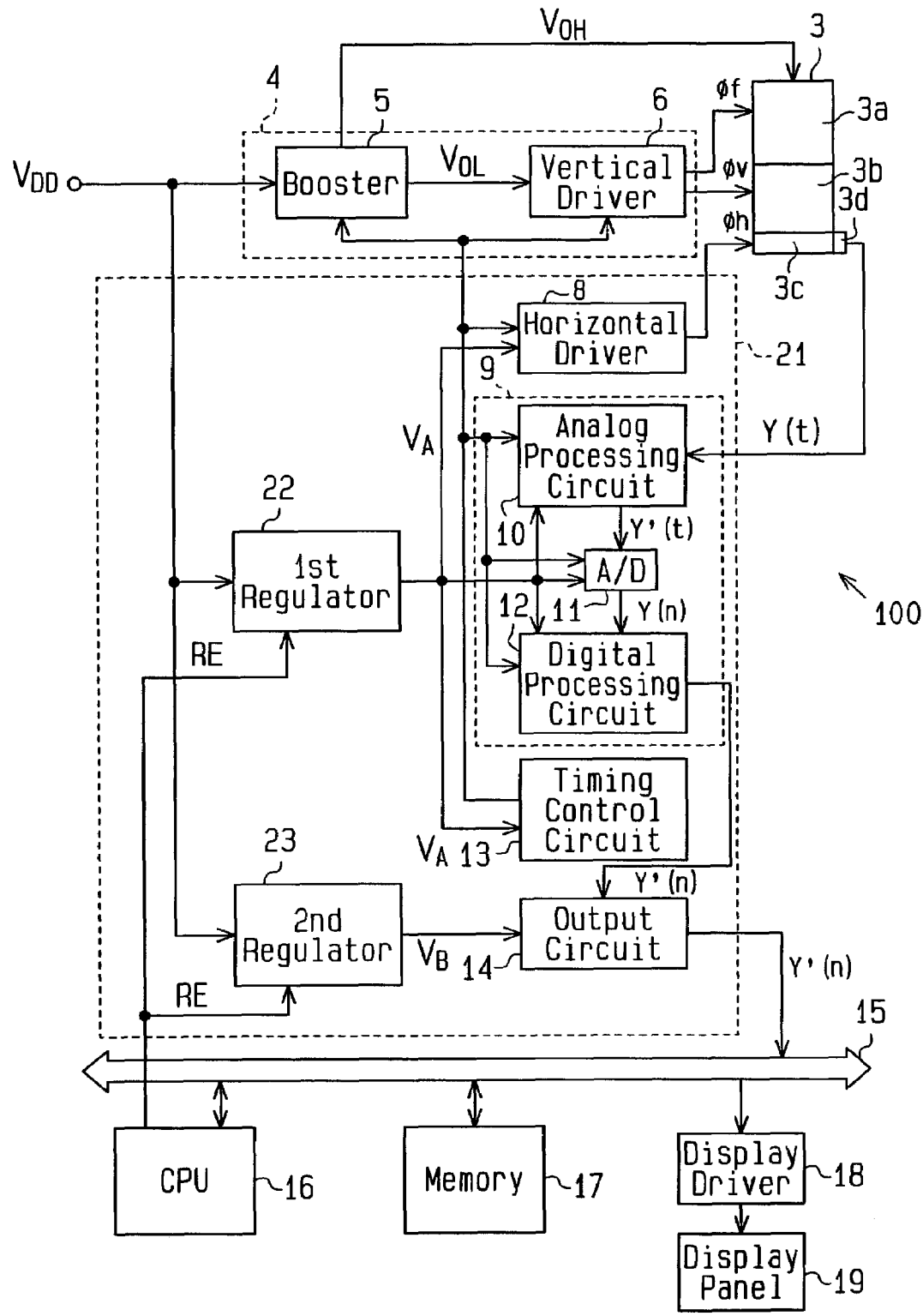
FIG. 2 is a schematic block diagram of an imaging apparatus including a signal processor according to a first embodiment of the present invention.

FIG. 2 is a schematic block diagram of an imaging apparatus 100 including an image signal processor 21 according to a first embodiment of the present invention. The signal processor 21 of the first embodiment includes a horizontal driver 8, a signal processing circuit 9, a timing control circuit 13, and an output circuit 14. The signal processor 21 performs a predetermined signal processing on an image signal Y(t), which is provided from a CCD image sensor 3, and provides the processed image signal to external device, which includes a memory 17 and a display driver 18. The imaging apparatus 100 further includes a first regulator circuit 22, which is connected to the signal processing circuit 9, and a second regulator circuit 23, which is connected to the output circuit 14. The present invention is characterized in that the first regulator circuit 22, which supplies the signal processing circuit 9 with the first regulated voltage, and the second regulator circuit 23, which supplies the output circuit 14 with the second regulated voltage, are provided separately.

The horizontal driver 8 operates with the regulated voltage VK and generates a horizontal transfer clock signal øh.

The horizontal transfer clock signal øh is provided to a horizontal transfer section 3c of a CCD image sensor 3.

The signal processing circuit 9 includes an analog processing circuit 10, an A/D converter 11, and a digital processing circuit 12. The signal processing circuit 9 operates with a regulated voltage corresponding to an output level of the CCD image sensor 3 and performs a predetermined signal processing on the image signal output from the image sensor 3.

The analog processing circuit 10 receives the image signal Y(t) from the CCD image sensor 3 and performs analog signal processing, such as a correlated double sampling (CDS) process and an automatic gain control (AGC) process, on the image signal Y(t). In the CDS process, the image signal Y(t), which repeats the reset level and the signal level, is clamped at the reset level. Subsequently, the signal level is extracted from the image signal Y(t) and an image signal having a continuous signal level is generated. In the AGC process, the image signals retrieved in the CDS process are integrated in units of single image screens or single vertical scan terms. The gain is feedback-controlled so that the integrated data is included in a predetermined range. The A/D converter 11 receives an image signal from the analog processing circuit 10, standardizes the image signal in synchronism with the image output timing of the CCD image sensor, and generates a digital image data signal Y(n). The digital image data signal Y(n) is provided to the digital processing circuit 12.

The digital processing circuit 12 performs processes such as color separation and a matrix operation on the digital image signal Y(n) to generate an image data signal Y'(n), which includes a luminance signal and a chrominance signal. For example, in the color separation process, the digital processing circuit 12 separates the image data Y(n) in accordance with a color array of a color filter, which is attached to the imaging section 3a of the CCD image sensor 3, to generate a plurality of color component signals. In the matrix operation process, the digital processing circuit 12 generates the luminance signal by synthesizing the separated color components and generates the chrominance signal by subtracting luminance components from each color components.

The timing control circuit 13 includes a plurality of counters (not shown), which count a reference clock signal CK that has a constant cycle, and determines a vertical scan and horizontal scan timing of the CCD image sensor 3. The timing control circuit 13 divides the reference clock signal CK, which is provided via a clock supply terminal (not shown), to generate the frame timing signal FT, the vertical synchronizing signal VT, and the horizontal synchronizing signal HT. The timing control circuit 13 provides the analog processing circuit 10, the A/D converter 11, and the digital processing circuit 12 with a timing signal to synchronize the operations of the A/D converter 11 and the digital processing circuit 12 with the operational timing of the CCD image sensor 3.

The output circuit 14 operates with the second regulated voltage VK, which corresponds to an input level of the external device that include the memory 17 and the display driver 18. Further, the output circuit 14 receives the image data signal Y'(n) from the digital processing circuit 12 of the signal processing circuit 9, and provides the image data signal Y'(n) to the external device via the system bus 15.

The first and second regulator circuits 22, 23 are each connected to a battery (not shown) via a power supply terminal (not shown) to receive power supply voltage VDD from the battery. The first regulator circuit 22 generates a first regulated voltage VA from the power supply voltage VDD. The second regulator circuit 23 generates a second regulated voltage VB from the power supply voltage VDD. The first regulated voltage VA is substantially equal to the optimum functional voltage of the horizontal driver 8 and the signal processing circuit 9 (e.g., 2.0 to 2.5V). That is, the first adjusted voltage VA is set in accordance with an output level of the CCD image sensor 3. The second regulated voltage VB is set to correspond with the optimum operational voltage of the output circuit 14 (e.g., 2.9V), or the input level of external device.

The first and second regulator circuits 22, 23 each operate in accordance with the operating state of the system bus 15, which is connected to the output circuit 14. More specifically, when the transmission of data and control signals between the signal processor 21 and the external device via the system bus 15 is not performed, or when the system bus 15 is not used, the generation of the first and second regulated voltages VA, VB is stopped. That is, the first and second regulator circuits 22, 23 are operated in accordance with a control signal RE, which is provided from a CPU 16 and indicates the state of the system bus 15. When the control signal RE indicates a state in which the system bus 15 is not being used, the generation of the first and second regulated voltages VA, VB is stopped. Accordingly, when the system bus 15 is not used, or when the CCD image sensor 3 and the external device stop operating, the power supply voltage is not supplied to the signal processing circuit 9 and the output circuit 14. The first and second regulator circuits 22, 23 may stop generating the first and second regulated voltages VA, VB during at least part of the time in which the bus 15 is not being used.

The stopping of the supply of power supply voltage to the signal processing circuit 9 and the output circuit 14 is especially effective when the signal processor 21 functions using an external battery as a power source. When a battery is used as the power supply of the signal processor 21, the signal processor 21 may be supplied with the power supply voltage even if the entire system, which includes the CCD image sensor 3 and the external device, is not operating. If the power supply voltage is supplied, this may cause a current leak in a circuit even if the signal processing circuit 9 and the output circuit 14 are not operating. This would result in power consumption. Accordingly, since the supply of power supply voltage from the battery is stopped when the CCD image sensor 3 and the external device stop operating, the current leaks that occur at the signal processing circuit 9 and the output circuit 14 are prevented. This avoids unnecessary power consumption.

The imaging apparatus 100 operates in the following manner. When the battery supplies the imaging apparatus 100 with the power supply voltage VDD (e.g., 3.2V), the power supply voltage VDD is supplied to the first and second regulator circuits 22, 23.

The first regulator circuit 22 converts the power supply voltage VDD to a first regulated voltage VA, which is substantially equal to the optimum operational voltage of the horizontal driver 8 and the signal processing circuit 9. The first regulated voltage VA is supplied to the horizontal driver 8 and the signal processing circuit 9 to operate the horizontal driver 8 and the signal processing circuit 9. The second regulator circuit 23 converts the power supply voltage VDD to a second regulated voltage VB (e.g., 2.9V), which is in accordance with the input level of the external device. The second regulated voltage VB is supplied to the output circuit 14 to operate the output circuit 14.

In the signal processor 21 of the first embodiment, the first and second regulator circuits 22, 23 respectively and independently supply the signal processing circuit 9 and the output circuit 14 with the regulated voltages. Thus, the signal processing circuit 9 and the output circuit 14 each operates with an optimal power supply voltage. As a result, unnecessary power is not consumed. This reduces power consumption. Further, the output voltages of the regulator circuits 22, 23 are set at the optimum operational voltages of the associated signal processing circuit 9 and the output circuit 14. Thus, the signal processing circuit 9 and the output circuit 14 are each supplied with the optimum operational voltage. This improves the operational characteristics of the signal processing circuit 9 and the output circuit 14.

Figure 3:
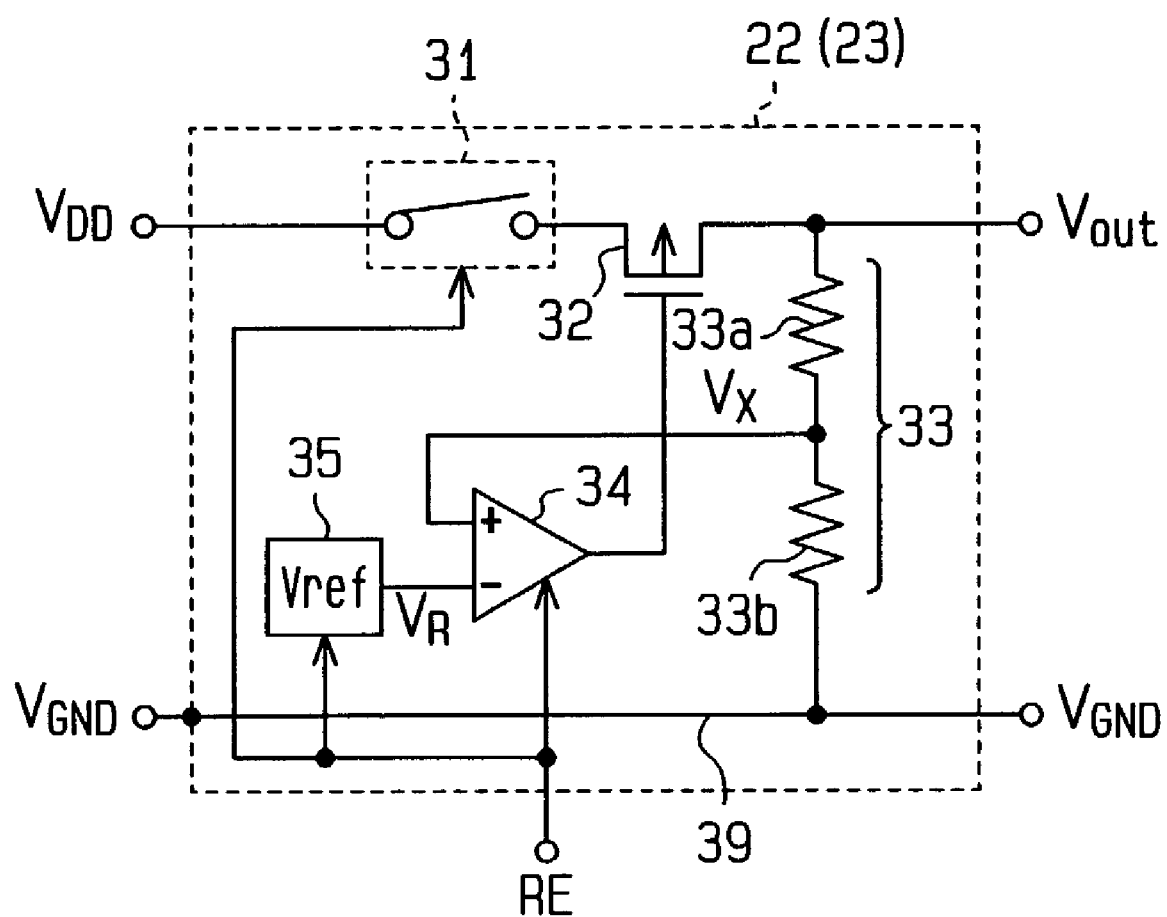
FIG. 3 is a schematic circuit diagram of a first regulator circuit employed in the signal processor of FIG. 2.

FIG. 3 is a schematic circuit diagram of the first and second regulator circuits 22, 23. The first and second regulator circuits 22, 23 basically have the same configuration and each includes a switch 31, a p-channel transistor 32, a resistor string 33, a comparator 34, and a reference voltage generation circuit 35.

The switch 31 is connected between a power supply terminal and the p-channel transistor 32. The p-channel transistor 32 is connected between the switch 31 and the output terminal 38. The gate of the p-channel transistor 32 is connected to the output terminal of the comparator 34. The resistor string 33 includes resistors 33a, 33b, which are connected in series between the drain of the p-channel transistor 32 and the ground. The median point between the resistor 33a and the resistor 33b is connected to a non-inverting terminal of the comparator 34. The reference voltage generation circuit 35 is connected to an inverting input terminal of the comparator 34.

The first and second regulator circuits 22, 23 function in the following manner. The resistances of the resistor 33a and the resistor 33b are represented by R1 and R2. When the power supply voltage VDD is supplied via the power supply terminal, the p-channel transistor 32 goes on and the power supply voltage VDD is supplied to the resistor string 33. The resistor string 33 divides the power supply voltage VDD and generates a divided voltage $VX=(R2/(R+R2))\cdot VDD$ at the median point of the resistor string 33. The divided voltage VX is provided to the non-inverting input terminal of the comparator 34.

Then, the comparator 34, which functions in accordance with the potential difference between the divided voltage VX and the reference voltage VR, controls the ON resistance of the p-channel transistor 32 so that the divided voltage VX and the reference voltage VR are equalized. More specifically, when the divided voltage VX is greater than the reference voltage VR, the comparator 34 causes the p-channel transistor 32 to go ON. When the divided voltage VX is less than the reference voltage VR, the comparator 34 causes the p-channel transistor 32 to go OFF. The first and second regulator circuits 22, 23 each generate a constant voltage (regulated voltage) $VOUT=((R1+R2)/R2)\cdot VR$ from the ratio of the resistances R1, R2 of the resistors 33a, 33b and the reference voltage VR of the reference voltage generation circuit 35.

In the first and second regulator circuits 22, 23, the dividing ratio of the resistor string 33 and the reference voltage VR are set in accordance with the optimum functional voltage of the following stage. This generates an optimal regulated voltage for the following stage.

The switch 31, the comparator 34, and the reference voltage generation circuit 35 receive the control signal RE from the CPU 16 and operate in accordance with the operational state of the system bus 15. More specifically, when the level of the control signal RE corresponds to a state in which the system bus 15 is being used, the switch 31 connects the power supply terminal and the p-channel transistor 32. The reference voltage generation circuit 35 generates the reference voltage VR, and the comparator 34 controls the ON resistance of the p-channel transistor 32 to equalize the divided voltage VX and the reference voltage VR. When the level of the control signal RE corresponds to a state in which the system bus 15 is not being used, the switch 31 disconnects the power supply terminal and the transistor 32 to stop the operation of the comparator 34 and the reference voltage generation circuit 35.

Since the regulator circuits 22, 23 stop operating when the system bus 15 is not being used, current leakage in the signal processing circuit 9 and the output circuit 14 is prevented. Further, the amount of power consumed by the regulator circuits 22, 23 is decreased. This further reduces the power consumption of the signal processor 21.

In the first embodiment, the first and second regulator circuits 22, 23 are arranged in the signal processor 21 and arranged on the same single chip semiconductor substrate as the signal processor 21. Thus, the first and second regulator circuits 22, 23 are manufactured simultaneously with the other circuits of the signal processor 21. This reduces cost and increases the manufacturing yield.

Figure 4:
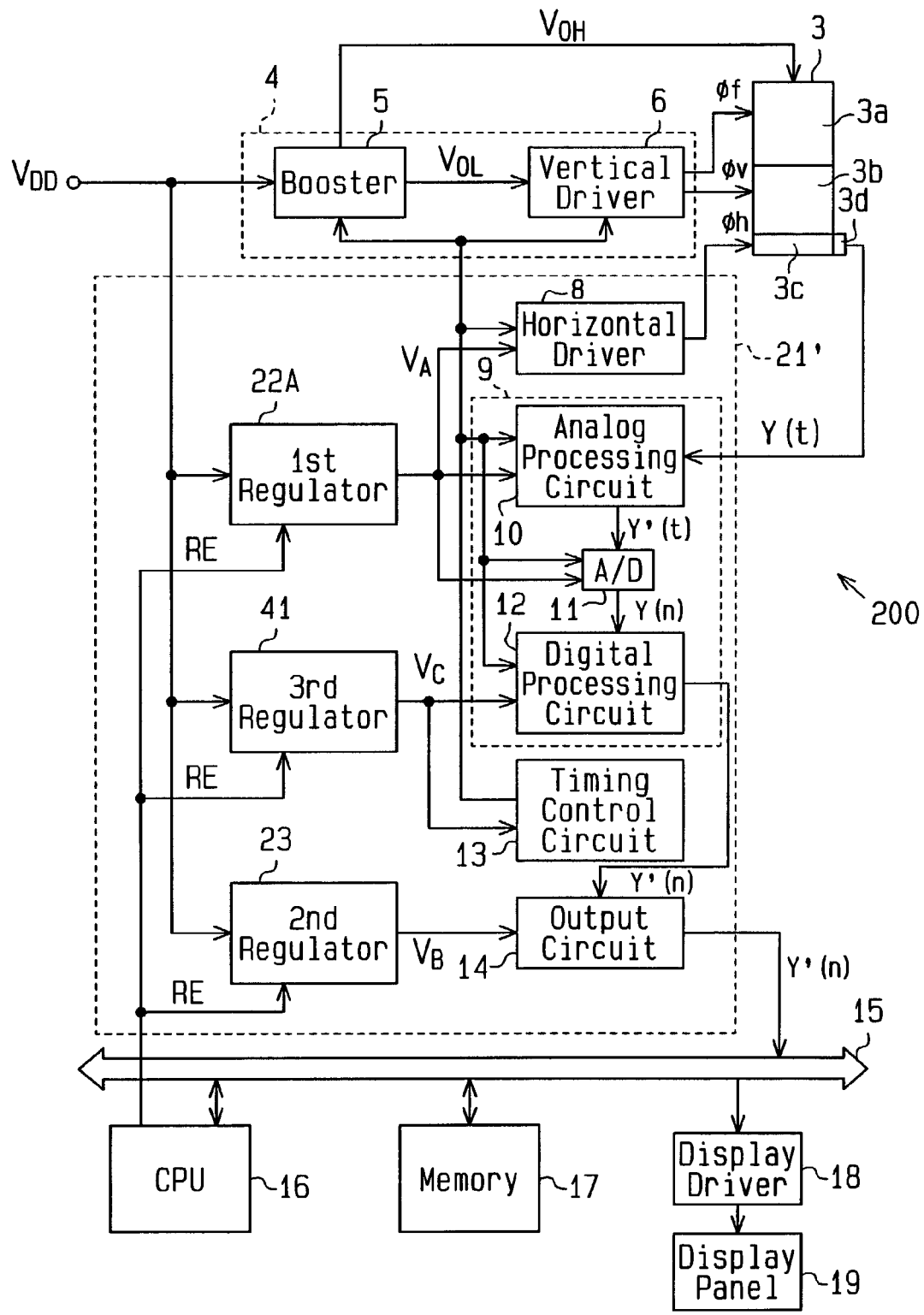
FIG. 4 is a schematic block diagram of an imaging apparatus including a signal processor according to a second embodiment of the present invention.

FIG. 4 is a schematic block diagram of an imaging apparatus 200 according to a second embodiment of the present invention.

The signal processor 21' includes a horizontal driver 8, a signal processing circuit 9, a timing control circuit 13, an output circuit 14, and three regulator circuits 22A, 23, 41.

The first regulator circuit 22A of the signal processor 21' is connected to the horizontal driver 8, the analog processing circuit 10, and the A/D converter 11. The third regulator circuit 41 is connected to the digital processing circuit 12 and the timing control circuit 13.

The first regulator circuit 22A generates a voltage that is substantially equal to the optimum operational voltage of the analog processing circuit 10 and the A/D converter 11 (e.g., 2.5V). The first regulator circuit 22A, which is supplied with the power supply voltage VDD from the battery (not shown), generates the first regulated voltage VA. The second regulator circuit 23, which is supplied with the power supply voltage VDD from the battery, generates the second regulated voltage VB (e.g., 2.9V), which is greater than the first regulated voltage VA.

The third regulator circuit 41 generates a voltage (e.g., 2.0V) that is substantially equal to the optimum operational voltage of the digital processing circuit 12 and the timing control circuit 13. The third regulator circuit 42, which is supplied with the power supply voltage VDD from the battery, generates a third regulated voltage VC, which is less than the first regulated voltage VA.

In the signal processor 21' of the second embodiment, the analog processing circuit 10 and the digital processing circuit 12 are provided with the third regulator circuit 41. Thus, the analog processing circuit 10 and the digital processing circuit 12 are each supplied with the optimal power supply voltage. This improves the operational characteristics for signal processing in the analog processing circuit 10 and the digital processing circuit 12. The third regulator circuit 41 generates the third regulated voltage VC, which is less than the first regulated voltage VA, and supplies the digital processing circuit 12 independently with the third regulated voltage VC. Since the digital processing circuit 12 is supplied with the optimal power supply voltage, the power consumption of the digital processing circuit 12 is reduced.

The configuration of the third regulator circuit 41 is substantially the same as the first and second regulator circuits 22, 23 of FIG. 3. The dividing ratio of the resistor string 33 and the reference voltage VR of the reference voltage generation circuit 35 in the third regulator circuit 41 are set in accordance with the optimum operational voltage of the digital processing circuit 12. Further, the third regulator circuit 41 operates in accordance with the control signal RE.

The imaging apparatus 200 of the second embodiment has the advantage described below.

When the control signal RE has a level corresponding to a state in which the system bus 15 is not operating, the supply of the first to third adjustment voltages VA-VC is stopped. Further, the operations of the reference voltage generation circuit 35 and the comparator 34 in the regulator circuits 22A, 23, 41 are stopped. This prevents power consumption caused by current leakage in the analog processing circuit 10, the digital processing circuit 12, and the output circuit 14 and suppresses power consumption in the regulator circuits 22A, 23, 41. As a result, the power consumption of the signal processor 21' is reduced.

Figure 5:
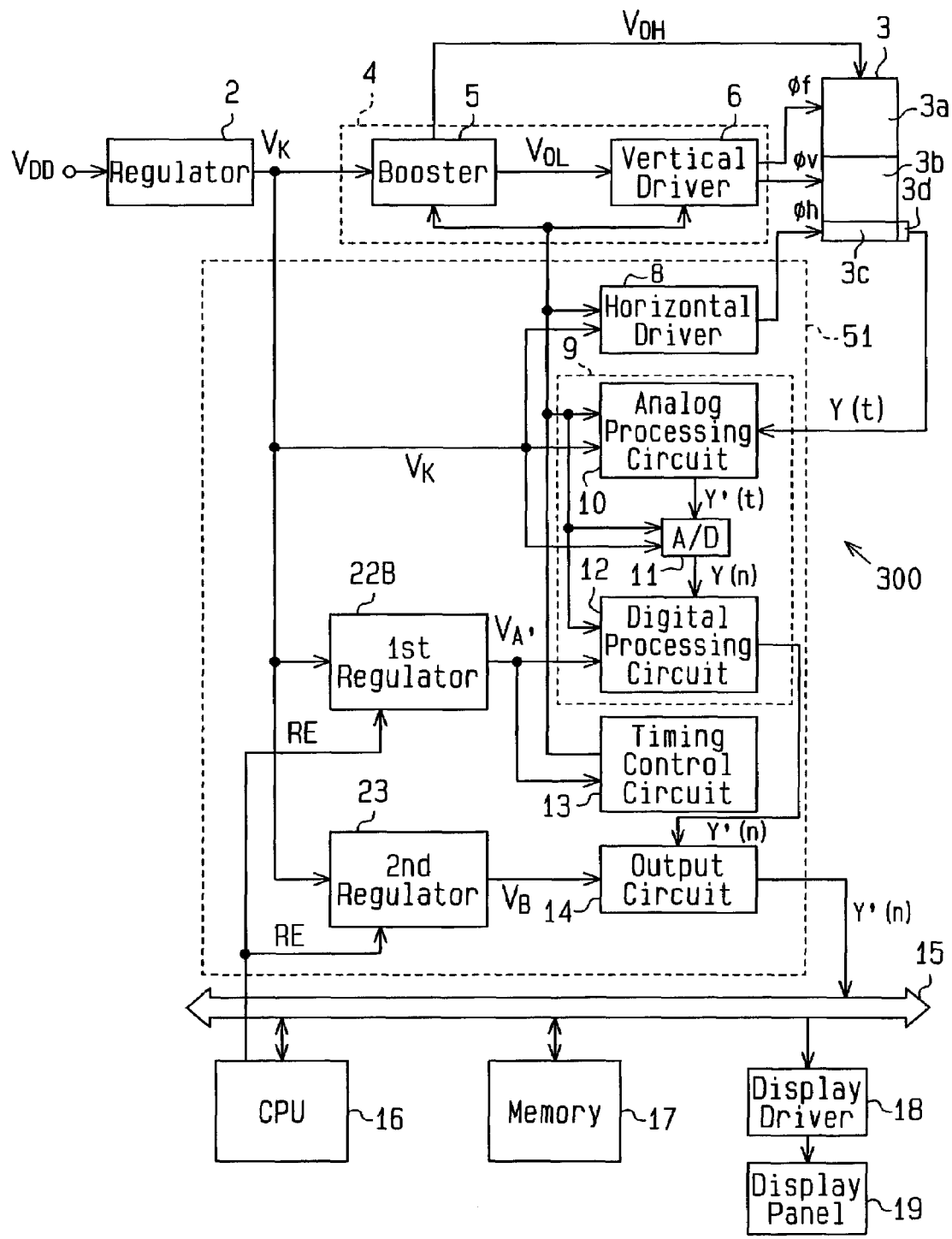
FIG. 5 is a schematic block diagram of an imaging apparatus including a signal processor according to a third embodiment of the present invention.

FIG. 5 is a schematic block diagram of an imaging apparatus 300 according to a third embodiment of the present invention. The imaging apparatus 300 includes the external regulator circuit 2 of FIG. 1. Thus, in the third embodiment, a signal processor 51 does not have the first regulator circuit 22A of the second embodiment.

In the third embodiment, the regulated voltage VK of the external regulator circuit 2 is supplied to the horizontal driver 8, the analog processing circuit 10, the A/D converter 11, the first regulator circuit 22B, and the second regulator circuit 23.

The output voltage (regulated voltage) VK of the external regulator circuit 2 is set at the optimum operational voltage (e.g., 2.5V) of the horizontal driver 8, the analog processing circuit 10, and the A/D converter 11. In the third embodiment, the regulated voltage VK of the external regulator circuit 2 is the power supply voltage of the signal processor 51.

The first regulator circuit 22B, which is connected to the digital processing circuit 12 and the timing control circuit 13, generates a first regulated voltage VA', which is substantially equal to the optimum operational voltage (e.g., 2.0V) of the digital processing circuit 12 and the timing control circuit 13. The first regulator circuit 22B, which is supplied with the regulated voltage VK from the external regulator circuit 2, generates a first regulated voltage VA' from the regulated voltage VK.

The second regulator circuit 23, which is supplied with the regulated voltage VK from the external regulator circuit 2, generates a second regulated voltage VB that is in accordance with the input level of the external device. The first and second regulator circuits 22, 23 are operated in accordance with the control signal RE. This prevents power from being consumed when the system bus 15 is not being used.

The imaging apparatus 300 of the third embodiment has the advantages described below.

The circuits of the signal processor 51 are supplied with the optimal voltage in the same manner as the first and second embodiments. Further, unnecessary power is not consumed.

Figure 6:
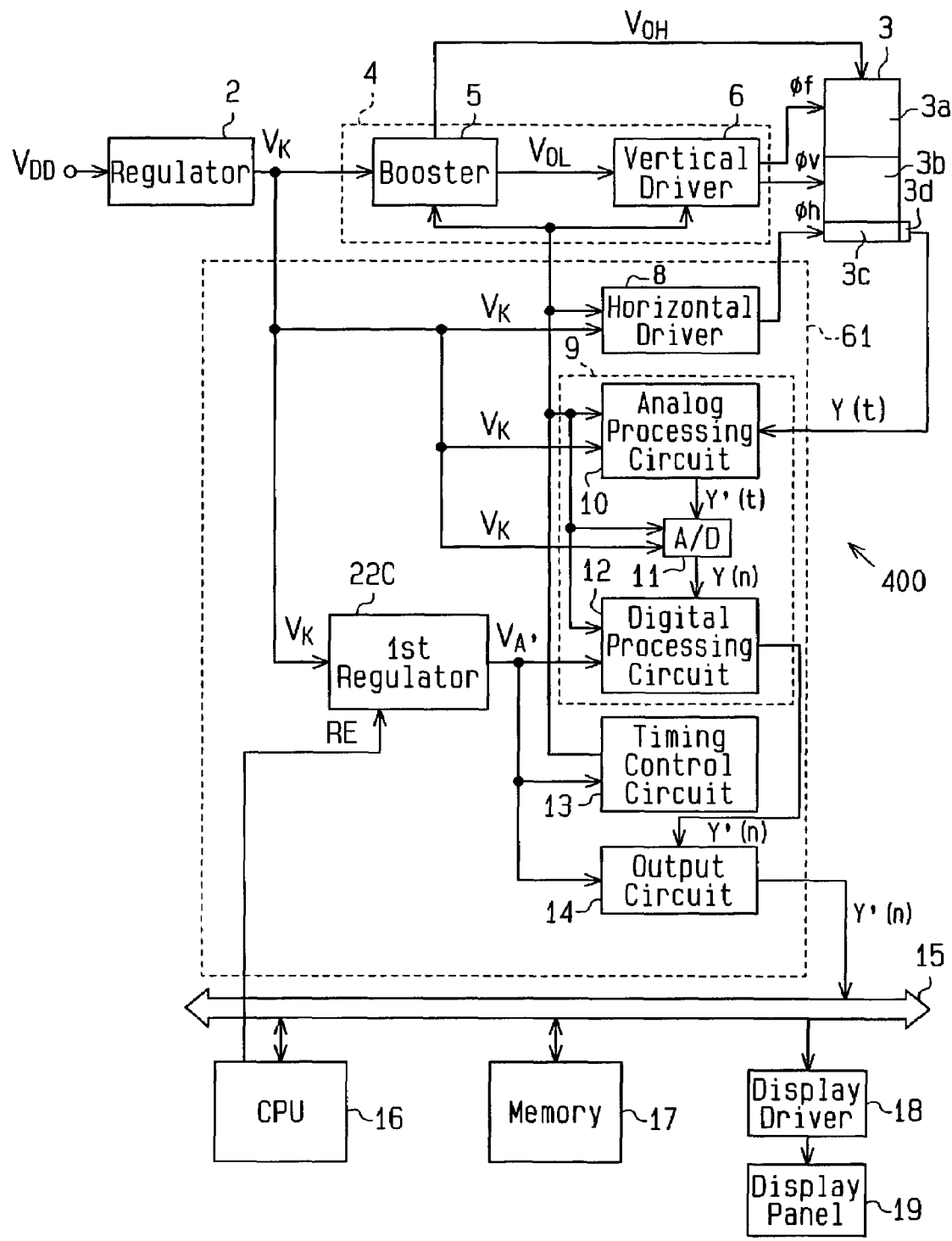
FIG. 6 is a schematic block diagram of an imaging apparatus including a signal processor according to a fourth embodiment of the present invention.

FIG. 6 is a schematic block diagram of an imaging apparatus 400 including a signal processor 61 according to a fourth embodiment of the present invention. In the fourth embodiment, the signal processor 61 includes a first regulator circuit 22C, which is used in common with the digital processing circuit 12, a timing control circuit 13, and an output circuit 14. The fourth embodiment may be applied when the input level of the external device including the CPU 16 and the memory 17 is substantially the same as the operational voltage (e.g., 2.0V or the vicinity of 2.0V) of the digital processing circuit 12 and the timing control circuit 13.

The first regulator circuit 22C, which is supplied with the regulated voltage from the external regulator circuit 2, generates a first regulated voltage VA', which is substantially equal to the operational voltage (e.g., 2.0V) optimal for the timing control circuit 13 and the output circuit 14. The first regulator circuit 22C operates in accordance with the control signal RE in the same manner as the regulator circuits 22, 22B, 23, 41 of FIGS. 2 to 5. The control using the control signal prevents power from being consumed when the system bus 15 is not being used.

In the fourth embodiment, the same advantages as the first to third embodiment is obtained with a smaller circuit scale.

It should be apparent to those skilled in the art that the present invention may be embodied in many other specific forms without departing from the spirit or scope of the invention. Particularly, it should be understood that the present invention may be embodied in the following forms.

In each embodiment, the operational voltage supplied to the horizontal driver 8 may be changed in accordance with the specification of the CCD image sensor 3. For example, when the optimum operational voltage of the horizontal driver 8 is closer to the operational voltage of the digital processing circuit 12 and the timing control circuit 13 than the operational voltage of the analog processing circuit 10 and the A/D converter 11, the horizontal driver 8 may be supplied with substantially the same voltage as the digital processing circuit 12 and the timing control circuit 13.

The present examples and embodiments are to be considered as illustrative and not restrictive, and the invention is not to be limited to the details given herein, but may be modified within the scope and equivalence of the appended claims.

What is claimed is:

1. An image signal processor for performing a predetermined signal process on an analog image signal that is generated by a solid-state imaging device, and for generating a digital image signal that is provided to an external device and that has a predetermined format, the image signal processor comprising:

a first regulator supplied with a power supply voltage to generate a first regulated voltage that is in accordance with an output level of the solid-state imaging device;

a second regulator supplied with the power supply voltage to generate a second regulated voltage that is in accordance with an input level of a bus and that is higher than the first regulated voltage;

a signal processing circuit configured to operate with the first regulated voltage, wherein the signal processing circuit is configured to perform predetermined signal processing on the analog image signal and to generate the digital image signal; and an output circuit configured to operate with the second regulated voltage, wherein the output circuit is configured to receive the digital image signal from the signal processing circuit and to provide the digital image signal to the external device through the bus;

wherein the image signal processor is on a single chip semiconductor substrate;

wherein the output circuit is connected to the external device via the bus; and wherein the first and second regulators, while being supplied with a power supply voltage, are configured to stop generating the first and second regulated voltages during at least part of a time when the bus is not in use.

2. The image signal processor according to claim 1, wherein the first regulated voltage is less than the power supply voltage.

3. The image signal processor according to claim 1, further comprising:

a third regulator supplied with the power supply voltage to generate a third regulated voltage;

wherein the signal processing circuit comprises:

an analog processing circuit configured to operate with the first regulated voltage, wherein the analog processing circuit is configured to perform a predetermined analog signal processing on the analog image signal; and a digital processing circuit configured to operate with the third regulated voltage, wherein the digital processing circuit is configured to perform a predetermined digital signal processing on a digitized analog image signal to generate the digital image signal, the digitized analog image signal being obtained from the analog image signal that has undergone the predetermined analog signal processing; and wherein the first, second and third regulators, while being supplied with a power supply voltage, are configured to stop generating the first, second and third regulated voltages, respectively, during at least part of the time when the bus is not in use.

4. The image signal processor according to claim 3, wherein the third regulated voltage is less than the first regulated voltage.

5. The image signal processor according to claim 1, wherein the signal processing circuit comprises:

an analog processing circuit configured to operate with the power supply voltage, wherein the analog processing circuit is configured to perform a predetermined analog signal processing on the analog image signal; and a digital processing circuit configured to operate with the first regulated voltage, wherein the digital processing circuit is configured to perform a predetermined digital signal processing on a digitized analog image signal to generate the digital image signal, the digitized analog image signal being obtained from the analog image signal that has-undergone the predetermined analog signal processing.

6. An image signal processor for performing a predetermined signal process on an analog image signal that is generated by a solid-state imaging device, and for generating a digital image signal that is provided to an external device and that has a predetermined format, the image signal processor comprising:

a regulator supplied with a power supply voltage that is in accordance with an output level of the solid-state imaging device, the regulator being configured to generate a regulated voltage that is in accordance with an input level of a bus and that is less than the power supply voltage;

an analog processing circuit configured to operate with the power supply voltage, wherein the analog processing circuit is configured to receive the analog image signal from the solid-state imaging device and to perform a predetermined analog signal processing on the analog image signal;

a digital processing circuit configured to operate with the regulated voltage, wherein the digital processing circuit is configured to perform a predetermined digital signal processing on a digitized analog image signal to generate the digital image signal, the digitized analog image signal being obtained from the analog image signal that has undergone the predetermined analog signal processing; and an output circuit configured to operate with the regulated voltage, wherein the output circuit is configured to receive the digital image signal from the digital processing circuit and to provide the digital image signal to the external device through the bus, wherein the image signal processor is on a single chip semiconductor substrate;

wherein the output circuit is connected to the external device via the bus; and wherein the regulator, while being supplied with a power supply voltage, is configured to stop generating the regulated voltage during at least part of a time when the bus is not in use.

7. A method for supplying power supply voltage to an image signal processor on a single chip semiconductor substrate, wherein the image signal processor comprises:

a signal processing circuit configured to perform a predetermined signal processing on an analog image signal that is generated by a solid-state imaging device and to generate, from the analog image signal, a digital image signal that has a predetermined format, and an output circuit to receive the digital image signal from the signal processing circuit and to provide the digital image signal to an external device, wherein the image signal processor comprises first and second regulators, and the output circuit is connected to the external device via a bus, wherein the method comprises:

using the first regulator, receiving the power supply voltage and generating a first regulated voltage that is in accordance with an output level of the solid-state imaging device;

supplying the first regulated voltage to the signal processing circuit;

using the second regulator, receiving the power supply voltage and generating a second regulated voltage that is in accordance with an input level of the bus and that is higher than the first regulated voltage;

supplying the second regulated voltage to the output circuit; and while receiving the power supply voltage, stopping supply of the first and second regulated voltages during at least part of a time when the bus is not in use.

8. The method according to claim 7, wherein the signal processing circuit comprises:

an analog processing circuit configured to operate with the first regulated voltage to perform a predetermined analog signal processing on the analog image signal, and a digital processing circuit configured to perform a predetermined digital signal processing on a digitized analog image signal to generate the digital image signal, the digitized analog image signal being obtained from the analog image signal that has undergone the predetermined analog signal processing,
wherein the method further comprises:
receiving the power supply voltage and generating a third regulated voltage;
supplying the third regulated voltage to the digital processing circuit; and
while receiving the power supply voltage, stopping supply of the first, second, and third regulated voltages during at least part of a time when the bus is not in use.

9. The method according to claim 8, wherein the third regulated voltage is less than the first regulated voltage.

* * * * *